United States Patent
Nunnery

(10) Patent No.: US 11,525,235 B2
(45) Date of Patent: Dec. 13, 2022

(54) COMPOSITE MANHOLE COVER WITH EMBEDDED DETECTION

(71) Applicant: Composite Access Products GP, LLC, McAllen, TX (US)

(72) Inventor: William C. Nunnery, Mission, TX (US)

(*) Notice: Subject to any disclaimer, the term of this patent is extended or adjusted under 35 U.S.C. 154(b) by 0 days.

(21) Appl. No.: 16/542,974

(22) Filed: Aug. 16, 2019

(65) Prior Publication Data

US 2019/0368154 A1 Dec. 5, 2019

Related U.S. Application Data

(63) Continuation-in-part of application No. 16/047,104, filed on Jul. 27, 2018, now abandoned, which is a continuation-in-part of application No. 15/820,595, filed on Nov. 22, 2017, now abandoned.

(60) Provisional application No. 62/432,941, filed on Dec. 12, 2016.

(51) Int. Cl.
| | |
|---|---|
| *E02D 29/14* | (2006.01) |
| *C08K 3/08* | (2006.01) |
| *G06K 19/07* | (2006.01) |
| *G01D 11/24* | (2006.01) |

(52) U.S. Cl.
CPC .............. *E02D 29/14* (2013.01); *C08K 3/08* (2013.01); *G06K 19/0723* (2013.01); *C08K 2003/0856* (2013.01); *E02D 2300/007* (2013.01); *E02D 2300/0017* (2013.01); *E02D 2300/0045* (2013.01); *E02D 2600/10* (2013.01); *G01D 11/245* (2013.01)

(58) Field of Classification Search
CPC ........................ E02D 29/14; E02D 2300/0014
See application file for complete search history.

(56) References Cited

U.S. PATENT DOCUMENTS

| | | | | | |
|---|---|---|---|---|---|
| 3,764,223 | A | * | 10/1973 | Lucero | E01C 23/0953 404/73 |
| 3,920,347 | A | * | 11/1975 | Sauriol | E02D 29/124 404/25 |
| 4,726,707 | A | | 2/1988 | Newton | |
| 5,195,841 | A | * | 3/1993 | Mullins | G01K 11/06 116/217 |
| 5,312,202 | A | * | 5/1994 | Newton | E02D 29/14 404/25 |

(Continued)

FOREIGN PATENT DOCUMENTS

EP 0822297 A2 * 2/1998 ........... E02D 29/124

OTHER PUBLICATIONS

Hancor; Hancor Design Aids Section screen-grab of http://www.hancor.com/daids/dh23_designd.asp using Wayback Machine (Year: 2002).*

(Continued)

*Primary Examiner* — Abigail A Risic
(74) *Attorney, Agent, or Firm* — Thrasher Associates

(57) ABSTRACT

A composite manhole cover includes a body made of a polymer that has a mass of magnetic material embedded there within. The mass of magnetic material is detectable by a metal detector and, therefore, the composite manhole is locatable by the metal detector when the composite manhole cover is obscured by a material such as pavement, dirt, sand, grass/sod, etc.

6 Claims, 5 Drawing Sheets

(56) References Cited

U.S. PATENT DOCUMENTS

| | | | |
|---|---|---|---|
| 5,592,785 A * | 1/1997 | Gavin | E02D 29/12 16/444 |
| 5,666,768 A * | 9/1997 | Gavin | E02D 29/12 16/438 |
| 6,161,985 A * | 12/2000 | Hinkle | E02D 29/1409 249/2 |
| 6,655,093 B1 * | 12/2003 | Gavin | E02D 29/12 220/4.26 |
| 6,984,670 B2 * | 1/2006 | Meyers, III | B29B 17/0042 521/40 |
| 7,361,834 B1 * | 4/2008 | Trangsrud | H02G 3/14 174/66 |
| 7,484,909 B2 | 2/2009 | Brady | |
| 7,616,119 B2 | 11/2009 | Corbett, Jr. | |
| 7,704,010 B2 | 4/2010 | Nolle | |
| 7,777,628 B2 | 8/2010 | Tilson, Jr. | |
| 8,258,977 B1 * | 9/2012 | Montestruque | H01Q 1/225 340/870.02 |
| 8,368,518 B1 | 2/2013 | Castrovinci | |
| 8,454,263 B2 | 6/2013 | Lorenz | |
| 8,674,830 B2 | 3/2014 | Lanham | |
| 8,807,873 B2 | 8/2014 | Kiest, Jr. | |
| 9,021,842 B2 | 5/2015 | Rix | |
| 9,127,431 B2 * | 9/2015 | Lanham | E05F 15/60 |
| 9,127,447 B2 * | 9/2015 | Beaudoin | E05C 3/12 |
| 9,151,431 B2 | 10/2015 | Kiest, Jr. | |
| 10,344,446 B2 * | 7/2019 | De Vries | E02D 29/1481 |
| 2004/0238623 A1 | 12/2004 | Asp | |
| 2006/0021396 A1 | 2/2006 | Javaux | |
| 2008/0103944 A1 | 5/2008 | Hagemann | |
| 2008/0186367 A1 | 8/2008 | Adkins | |
| 2009/0214292 A1 | 8/2009 | Crissman | |
| 2009/0252552 A1 * | 10/2009 | Wiedrich | E02D 29/14 404/25 |
| 2010/0178106 A1 * | 7/2010 | Mitchell | E02D 29/1409 404/26 |

OTHER PUBLICATIONS

Acadian Industrial Textiles; "Understanding Carbon Black" screen-grab of https://acadiantextiles.com/news/carbon-black/ (Year: 2018).*

* cited by examiner

COMPOSITE MANHOLE COVER WITH EMBEDDED DETECTION

CROSS-REFERENCE TO RELATED APPLICATION

This application is a continuation-in-part of U.S. patent application Ser. No. 16/047,104 filed Jul. 27, 2018; which is a continuation-in-part of U.S. patent application Ser. No. 15/820,595, filed Nov. 22, 2017, which is a continuation of U.S. Provisional Application Ser. No. 62/432,941, filed Dec. 12, 2016.

FIELD

This invention relates to the field of underground utility access and more particularly to a composite manhole cover with locating components.

BACKGROUND

Underground utility systems are used in cities across the world for infrastructure and maintenance. In order to do their job, municipal workers must enter the underground system in various locations across a city. Workers access these systems via manholes that are sealed with manhole covers. Manhole covers are often made of cast metals.

Many problems arise with the heavy, metal manhole covers. First, they are difficult and dangerous to lift and maneuver. Second, the manholes are a target for thieves that aim to salvage the metal for recycled scrap value. Third, gases produced in wastewater corrode the metal covers and frames weakening them or fusing them shut. Fourth, in some areas metal conducts extremely hot temperatures from steam transmission that burn pedestrians and their pets. Finally, a metal manhole cover can be lethal if a gas explosion launches the metal cover off of the manhole.

Another aspect of underground utility access systems is tracking, storing, and maintaining pertinent information about the systems. Useful information includes data such as date of access, installation date, sewer depth, GPS location of manhole covers, manufacturing date, sewage flow rates, etc. A manhole cover that includes an electronic component allows municipal workers to track point-of-use information.

However, attaching the electronic component by fastening or adhering mechanically or chemically to the metal manhole cover degrades the properties of such. Fastening and/or adhering mechanically require machining or abrading the surface of the metal manhole cover. Boring and drilling holes into metal manhole covers/components reduce structural strength and provides further surface area for increased oxidation and weakening of the component. Molding or inserting electronic components into metal manhole covers will not function properly because of the metal interferes with radio signals emitted from the electronic components.

Often, manhole covers are difficult to find as they are sometimes paved over or covered in dirt. Once the manhole cover is obscured in such a way, there is little or no visual way of locating the manhole cover. In the past, metal detectors were used to locate the obscured manhole covers as the manhole covers of the prior art were typically made of a ferrous material such as iron that is easily detected by a metal detector. The disclosed manhole covers are not made of a ferrous material, being made of a composite material such as unsaturated polyester, vinyl ester, epoxy, or a blend of such. The disclosed materials are not detectable using a metal detector. Even though some of the embedded electronic components include metals that are detectable by a metal detector, the overall mass of metal in the disclosed manhole cover is not easily detected by a metal detector through a layer of asphalt, sand, or dirt.

What is needed is a manhole cover that is locatable using a metal detector.

SUMMARY

The disclosed invention encapsulates a material that is detectable by a metal detector into a manhole cover using a composite molding process. The material (e.g. iron, magnets) interacts with a metal detector, permitting detection of a composite manhole cover that has been obscured by, for example, a layer of asphalt, sand, dirt, sod, etc.

Producing a manhole cover using the disclosed materials and processes allows for electronic and mechanical components to be molded within the manhole cover instead of externally attached to the manhole cover as was done in the past. This composite manhole cover is durable and lighter in weight. A lighter weight manhole cover reduces incidental damage caused by handling of the manhole cover or shocks caused by conduction with underground power lines. Further, such manhole covers enable radio frequency permeation and are more resilient to both high and low temperatures. Such composite manhole covers are difficult to locate once obscured as they are not made of a material that is detectable by a metal detector. The present application includes a magnetic material embedded into the composite manhole cover that interacts with industry standard metal detectors, allowing for locating of an obscured composite manhole cover. Although many magnetic materials are anticipated, iron and/or a permanent magnet are two materials that are preferred due to cost and availability.

In one embodiment, a composite manhole cover is disclosed including a body made of a polymer that has a mass of magnetic material embedded there within. The mass of magnetic material is detectable by a metal detector and, therefore, the composite manhole is locatable by the metal detector when the composite manhole cover is obscured by a material such as pavement, dirt, sand, grass/sod, etc.

In another embodiment, a composite manhole cover is disclosed including a body that is formed of a polymer and a mass of magnetic material embedded within the body. The mass of magnetic material is detectable by a metal detector. The body further comprises at least one electronic component that is placed within the polymer prior to curing of the polymer. The composite manhole is locatable by the metal detector by way of the mass of magnetic material when the composite manhole cover is obscured by a material.

In another embodiment, a method of locating a composite manhole cover is disclosed. The composite manhole cover is made of a polymer. The method includes embedding a mass of magnetic material within a body of the composite manhole cover while molding the composite manhole cover. After the composite manhole cover becomes obscured, scanning an area in which the composite manhole cover is obscured from vision using a metal detector. The metal detector signaling when the metal detector passes over the mass of magnetic material, thereby locating the composite manhole cover.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
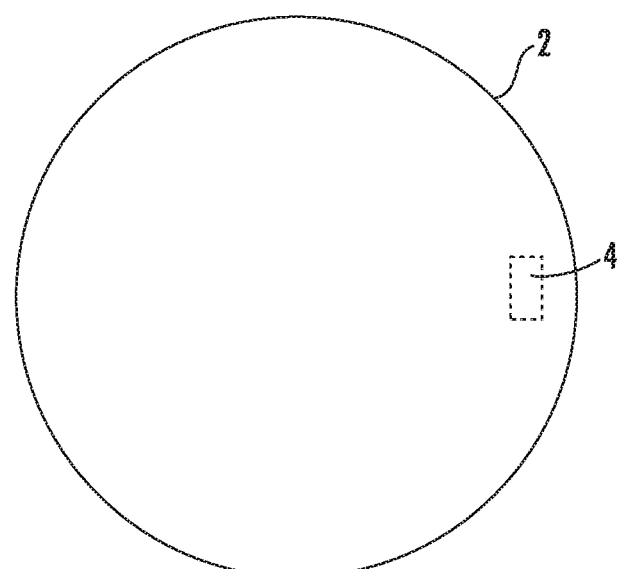
FIG. 1 illustrates a plan view of the composite manhole cover with in-molded electronic component.

Reference will now be made in detail to the presently preferred embodiments of the invention, examples of which are illustrated in the accompanying drawings. Throughout the following detailed description, the same reference numerals refer to the same elements in all figures.

Figure 2:
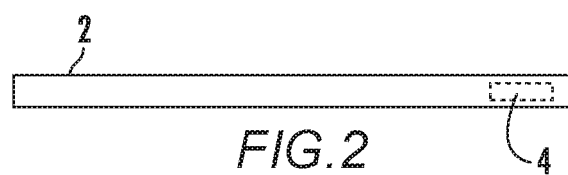
FIG. 2 illustrates a cross-sectional view of the composite manhole cover with an in-molded electronic component.

FIG. 1 shows a plan view of a composite manhole cover 2 having embedded (e.g. molded-in) electronic/mechanical components 4. FIG. 2 shows a cross-sectional view of the composite manhole cover 2 having embedded electronic/mechanical components 4. Note that the location of the electronic/mechanical components 4 is shown as an example and it is fully anticipated that the electronic/mechanical components 4 be located at any location within the composite manhole cover 2, including near or on any surface of the composite manhole cover 2.

Although any use is anticipated for the electronic/mechanical components 4, in one embodiment, the electronic/mechanical components 4 provide point-of-use information to municipal workers. Point-of-use information will eliminate wasted time searching through archives and travelling away from the asset to the administrative offices for accessing database, etc. Storing point-of-use information will also reduce the frequency with which municipal workers need to open the composite manhole cover 2 to verify information about the underground utility system, thereby decreasing the chance of a workplace injury.

In some embodiments, identifying, tracking, and maintaining the assets and information is done with a central computer. In other embodiments, identifying, tracking, and maintaining the information is done with a handheld device. There is no restriction on the type of device or proximity range of the device used to read/write information to/from the electronic/mechanical components 4.

Figure 3:
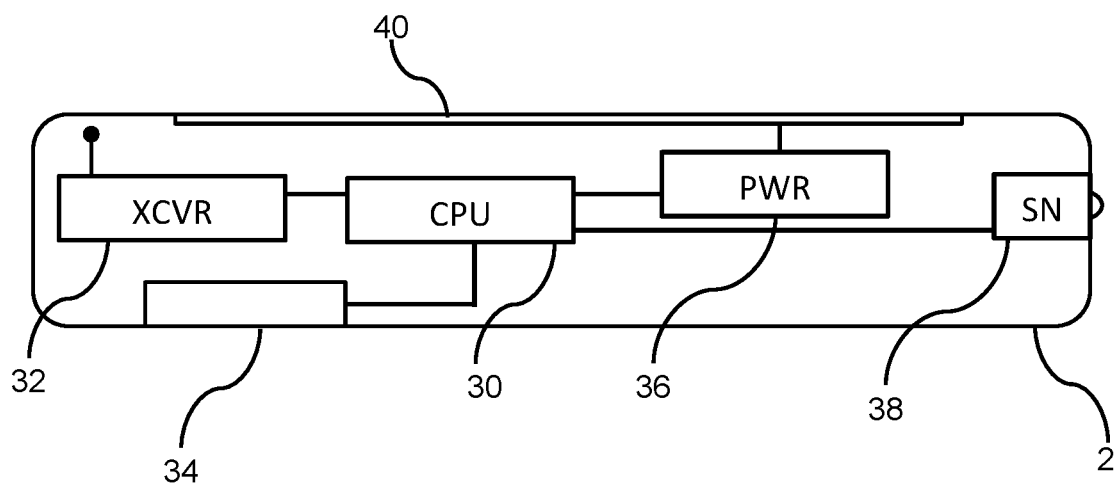
FIG. 3 illustrates an example of the in-molded electronic component.

Referring to FIG. 3, one exemplary electronic/mechanical component 4 is shown embedded in the composite manhole cover 2. In this example, a processor 30 (e.g., programmable interrupt controller—PIC, controller, any processing element, discrete components for controlling) receives inputs from one or more sensors 34/38. Examples of such sensors 34/38 include, but are not limited to, gas sensors, light sensors, fluid depth sensors, and moisture sensors, tamper sensors 38. The processor 30 receives input data from the sensors 34/38. The data is processed and/or stored within a memory of the processor 30. When needed, or continuously, the data (or processed data) is emitted from of the composite manhole cover 2, in this example, through a transceiver 32, though a transmitter is also anticipated. The transceiver 32 sends the data to an external receiver over radio waves or light waves. In some embodiments, due to power restrictions resulting in limited range of transmission, the external receiver must be near the composite manhole cover 2 while in other embodiments, the receiver is located at a greater distance and communicates with many composite manhole covers 2. In some embodiments, the transceiver 32 is only a transmitter, periodically transmitting information but not receiving information/control back. In some embodiments, the transceiver 32 includes receiving capabilities for reasons including configuration management, control, and acknowledgement.

Power is provide to the processor 30, sensors 34/38, and transceiver 32 by a power subsystem 36 that includes a device for power storage (e.g., a battery, super capacitor) and, in some embodiments, includes a solar collector 40 that is used to recharge the device for power storage.

In one exemplary usage scenario, back flow of sewage in sanitary system is detected by the sensor 34 and relayed to the processor 30 in the composite manhole cover 2 before the fluid level reaches the street. Another exemplary usage scenario includes detecting when a composite manhole cover 2 is opened by a tamper sensor 38 (e.g., a micro switch) so that steps can be taken to understand why one has accessed the manhole without authorization. Another example is using a sensor 34 to measure a gas concentration level inside the sewer, perhaps preventing accidental death from fatal exposures to hydrogen sulfide gas.

Figure 4:
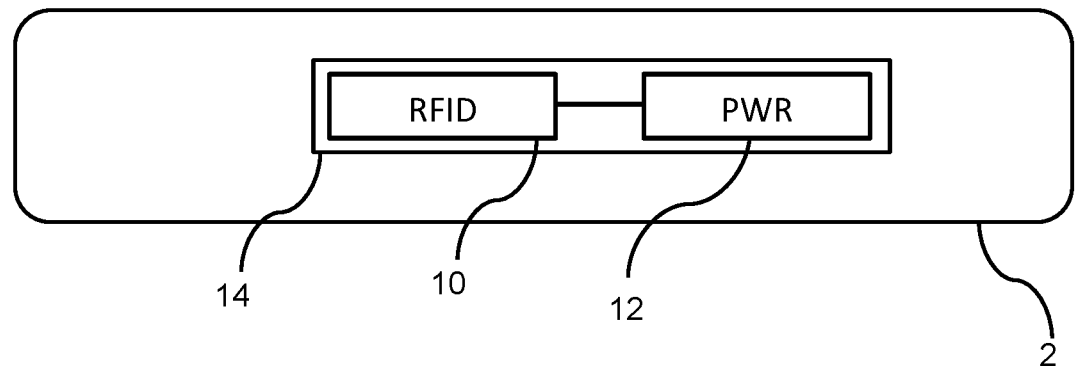
FIG. 4 illustrates a second example of the in-molded electronic component.

Referring to FIG. 4, an embodiment in which the electronic/mechanical component 4 is a radio frequency identification device (RFID) 10 is shown. RFIDs 10 are typically either active (powered by a power source 12 such as a battery) or passive (unpowered or powered by the electromagnetic energy transmitted from an RFID reader). An RFID 10 sends information to reader device, typically only after being prompted for that information by the reader device.

In some embodiments, the RFIDs include a factory programmed identification value that uniquely identifies each particular RFID 10, and hence the composite manhole cover 2.

In some embodiments, the RFID 10 is coated with a polymer insulator 14 that protects the RFID 10 and other components from abrasion, high pressure, and high temperatures that are present during the composite molding process. The polymer insulator 14 coats electronic/mechanical components 4 before insertion/embedding into the composite manhole cover 2. Examples of materials used for the polymer insulator 14 include, but are not limited to, unsaturated polyester, vinyl ester, epoxy, or a blend of these, with a compatible monomer to dissolve the polymer in solution. Compatible monomers include, but are not limited to, styrene, vinyl toluene, diallyl phthalate, and bisphenol A.

In some embodiments, the RFID 10 requires no power source 12, utilizing radio frequency energy emitted by an RFID reader (not shown for brevity reasons). In some embodiments, the RFID requires power from a power source 12 (e.g., a battery, super capacitor) and, in some embodiments, includes a solar collector 40 as in FIG. 3 that is used to recharge the power source 12.

Methods of making a composite manhole cover 2 include glass fiber reinforced plastic (GFRP) techniques like polymer concrete, cast polymer, resin transfer molding, resin infusion, filament winding, gun chopped fiberglass and resin that is applied directly by an applicator, a brush, roller, hand spreader, or sprayer—often referred to as spray-up layup.

Newer, high volume methods called sheet molding compounds (SMC), thick molding compounds (TMC), and bulk molding compounds (BMC) have been used to mold composites in less time than GFRP methods.

The composite manhole cover 2 is made of a fiber reinforced thermosetting resin compound. Examples of thermosetting resin compounds include: polyester resin, polyurethanes, phenol-formaldehyde resins, urea-formaldehyde, benzoxazines, epoxy resin, diallyl-phthalate, polyimides, furan, silicone, and vinyl ester. Before the compound has set and formed the composite manhole cover 2, a composite mixture is prepared. The composite mixture is made with three major components: resins, fibers, and fillers. The three major ingredients account for ninety to ninety-five percent of the composite by weight. The remaining five to ten percent includes mold release agents, chemical initiators, pigments, thickeners, shrink control additives, and inhibitors.

Resins are supplied in a liquid form so that the fibers, fillers, and other additives blend in a homogeneous way. Resins are made with unsaturated polyesters, vinyl esters, epoxies, and blends of these.

In embodiments using glass fiber reinforcements, glass fibers are made from a low-alkali borosilicate glass formulation known as "E glass." E glass is melted and blended then cooled and solidified. The solid glass forms strands of fiber that are collected in spools. These spools are used to form various weaves, chopped strands, mats, rovings, ropes, or other presentations. All presentations of the glass fiber give the composite manhole cover 2 stronger mechanical properties and are selected based on geometry and end-use application.

Fillers are added to the composite mixture to reduce cost, increase the viscosity, and give the composite manhole cover 2 properties such as flame retardant, corrosion resistance, increased density, low shrinkage, hardness, and electrical properties. Fillers are inorganic minerals. Suitable fillers include calcium carbonate, aluminum trihydrate, clay, calcium sulfate, barium sulfate, and silicates. These fillers are formed by milling, grinding, and/or precipitating the minerals into particles and separating the particles into a range of sizes. Suitable filler particle sizes range from one micron to one hundred microns.

Mold release agents are added to the composite mixture to ensure that the composite manhole cover 2 does not stick to the mold surface after curing. In some embodiments, the mold release agents are fatty acids. Exemplary fatty acids include calcium stearates, zinc stearates, and magnesium stearates. In other embodiments, alkyl phosphates are used.

Initiators are added to the composite mixture to start the chemical reaction resulting in cross-linking of the resins. In some embodiments, initiators are organic peroxides like diacyl peroxides, peroxy esters, diperoxy ketals, dialkyl peroxides. Some organic peroxides are activated with heat and pressure while some organic peroxides are activated with photo initiators.

Optionally, it is desirable to change the color or provide ultraviolet resistance for the composite manhole cover 2. In some embodiments, pigments are added to the composite mixture to create colors and impart ultraviolet resistance. An exemplary pigment is carbon black.

Thickeners are used to increase the viscosity of the composite mixture. Exemplary thickeners are calcium oxide, calcium hydroxide, magnesium oxide, magnesium hydroxide, fused silica, and water.

In some embodiments, shrink control additives are included in the composite mixture. Shrink control additives reduce the contraction of the composite mixture during the curing process. This is accomplished with thermoplastic additives like polyethylene, polystyrene, polyvinyl chloride, cellulose acetate and butyrate, polycaprolactone, polyvinyl acetate, polymethyl methacrylate, and thermoplastic polyesters.

In some embodiments, inhibitors are included to prevent premature curing. Suitable inhibitors include hydroquinone, parabenzoquinone, tertiary butyl catechol, tertiary butyl hydroquinone, and 2,6-ditertiary butyl-4-methyl phenol.

Now turning to a discussion of preparing the composite mixture for production of the composite manhole cover 2.

First, the liquid and small volume additive constituents (e.g. resins, initiators, inhibitors, pigments, shrink control agents) are blended in a high shear, high speed dispersions to create a homogenous liquid slurry.

Next, in embodiments using the BMC method, the liquid slurry is blended with the fibers and fillers in a low shear mixer. In embodiments using the SMC or TMC method, the liquid slurry is added directly to the other ingredients and blended with rollers that squeeze the materials together.

The composite mixture is inserted into the mold manually, robotically, by a gravity system, by a vacuum pull, by a pump, or with a pneumatic sprayer.

In some embodiments, a higher strength rating is required (e.g. airport runways). In these embodiments, an extra reinforcement of fiber glass roving, pultrusion, glass prepregs, or other higher strength support may be placed in the cavity of the mold before adding the composite mixture.

Next, the electronic/mechanical components 4 are added to the composite mixture.

After the composite mixture and any electronic/mechanical components 4 are in the mold, curing is initiated. Depending on the embodiment, the electronic or mechanical components that are added to the mold include, for example, a RFID 10, a power source 12, a processor 30, a transceiver 32, sensors 34/38, a power subsystem 36, and/or a solar collector 40.

In some embodiments, the composite mixture is cured under high temperature and pressure (approximately 270 to 350 degrees Fahrenheit and 500 to 1500 pounds per square inch). In other embodiments, the composite mixture is cured at ambient temperature and pressure.

After curing is complete, the composite manhole cover 2 is extracted from the mold cavity. The end product is a composite manhole cover 2, optionally including embedded electronic components and/or mechanical components (electronic/mechanical components 4).

Being held within a composite material that does not significantly impact radio frequency transmission, the electronic/mechanical components 4 (e.g. transceiver 32, RFID 10) readily communicate with external devices electronic/mechanical components 4 (not shown for brevity reasons). In some embodiments, this communication includes, but is not limited to, information such as serial number, GPS location, manufacturing date, installation date, inspection date, sewer depth, flow direction, connections, inlets, drop pipes, lift stations, offsets, riser rings, cone type, manhole wall material, installer, inspector, processing station identification, maintenance date, photographs, and other pertinent information to the municipality or owner.

In some embodiments, the RFIDs 10 have user memory. It is anticipated that in some embodiments, the data will be transferred and stored on an external device and/or downloaded to a remote computer. Some examples of data stored in the user memory will be predetermined while some types of data will be determined by the municipality or owner of the composite manhole cover 2. In addition to static identification data, the system will allow entry of variable data inputs, for example current condition of the manhole and composite manhole cover 2, sewer effluent levels and other observations and measurements recorded during a scheduled preventive maintenance review, programmed register, or corrective/containment action.

Municipalities also invest in Capital Asset Tracking (CAT) and/or geographic information system or (GIS) software that maps the location and topography of the municipal assets throughout the city. Information gathered by the electronic/mechanical components 4 is uploaded onto current CAT/GIS software platforms (e.g. Arc Gis, Cityworks, Cartograf) in a ".xml" file format so that cities can have up to date condition and status reports on these specific assets stored on their current computer system.

In some embodiments, the composite manhole cover is installed with a composite manhole frame 7. The composite manhole frame 7 is made, for example, using the same process as described above for the composite manhole cover 2. The composite manhole frame 7 is typically installed in an opening of a street atop a riser (not shown for brevity reasons), though there is no restriction as to how the composite manhole frame 7 be installed.

Figure 5:
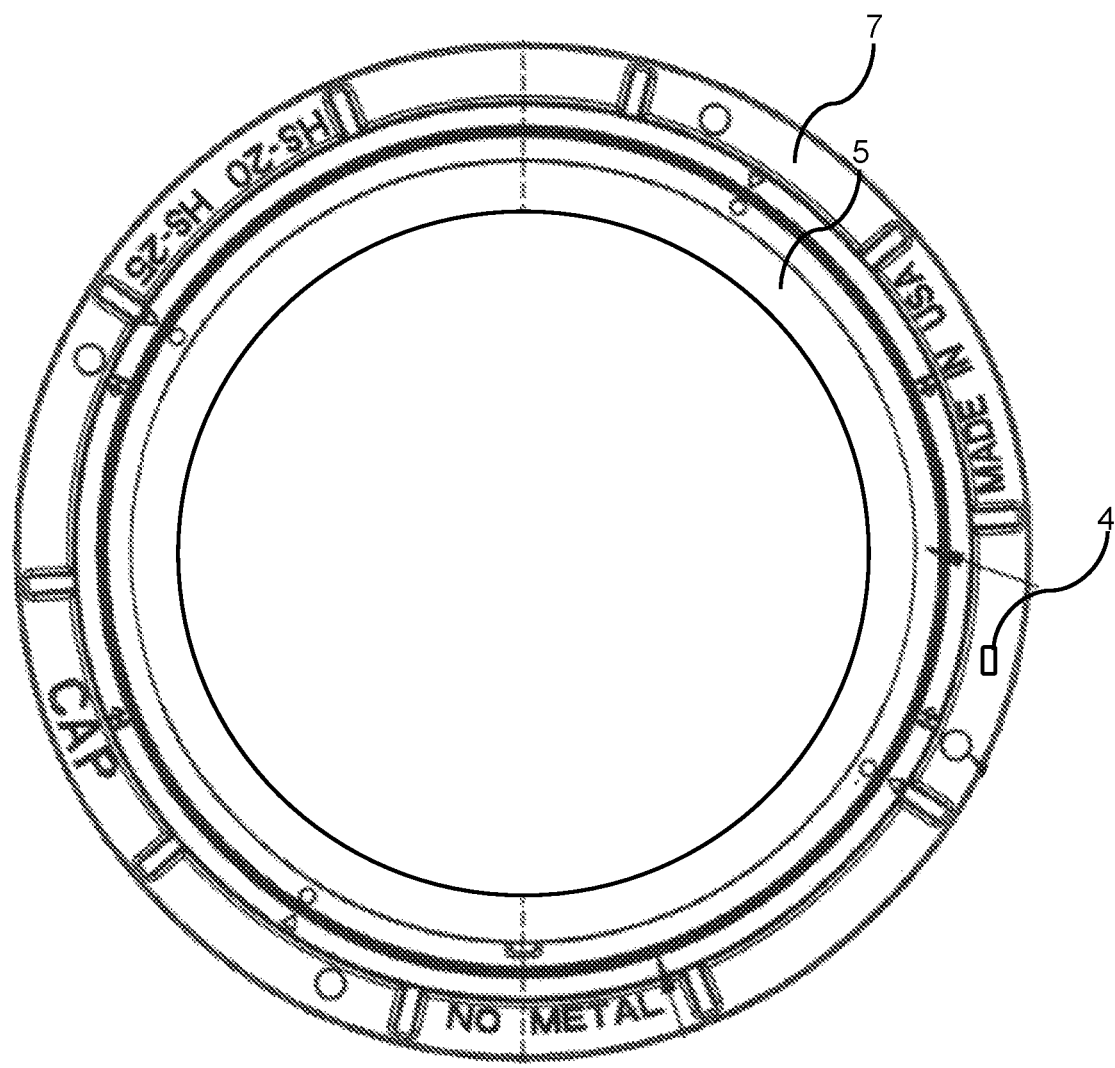
FIG. 5 illustrates a plan view of a composite manhole frame with the in-molded electronic component.
Figure 6:
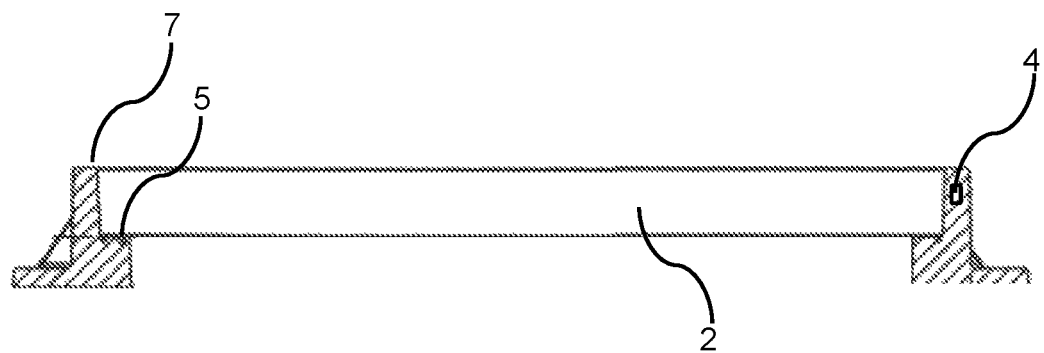
FIG. 6 illustrates a cross-sectional view of the composite manhole frame and manhole cover with the in-molded electronic component.
Figure 7:
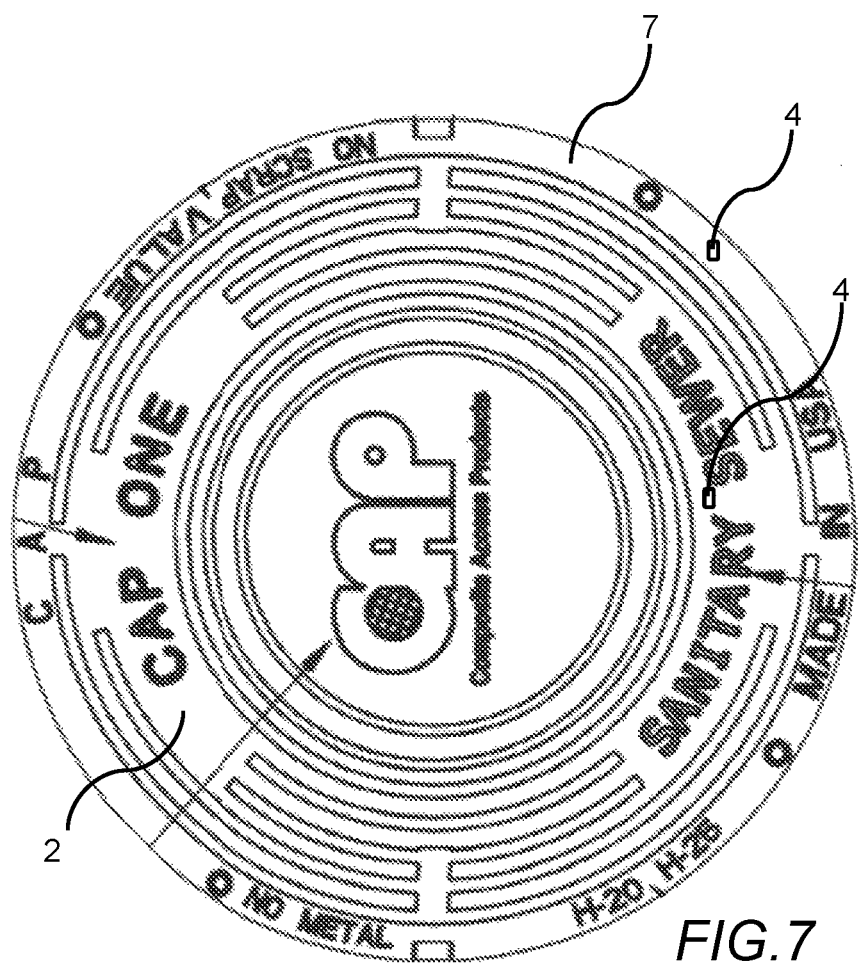
FIG. 7 illustrates a second plan view of the composite manhole frame and manhole cover with the in-molded electronic component.

Referring to FIGS. 5-7, views of the composite manhole frame 7 with embedded electronic/mechanical components 4 (same as electronic/mechanical components 4). Just as the disclosed composite manhole cover 2 includes electronic/mechanical components 4, it is anticipated that, in some embodiments, the composite manhole frame 7, also include electronic/mechanical components 4.

In the examples shown in FIGS. 5-7, an electronic/mechanical component 4 is molded into the composite manhole frame 7. It is fully anticipated that any electronic/mechanical components 4 be molded into the composite manhole frame 7 such as the electronic device of FIG. 3, having a processor 30. The location of which is anywhere within the frame body of the composite manhole frame 7, as in some embodiments, the electronic/mechanical components 4 is/are located in the wall of the frame body of the composite manhole frame 7.

In some embodiments, the composite manhole frame 7 has a flange 5 on which the composite manhole cover 2 rests.

In FIG. 7, the composite manhole cover 2 is shown installed within the composite manhole frame 7, each having its own electronic/mechanical components 4.

In some embodiments, the electronic/mechanical components 4 are molded into the frame only and not into the composite manhole cover 2 or visa-versa.

Figure 8:
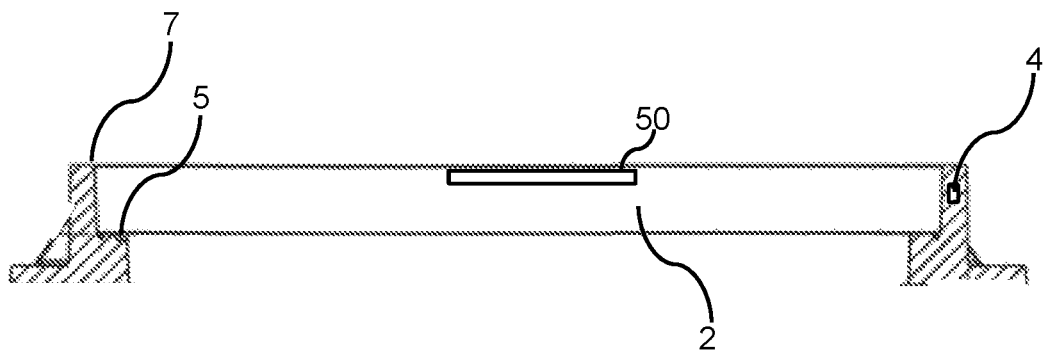
FIG. 8 illustrates a cross-sectional view of the composite manhole frame and manhole cover with embedded magnetic material.
Figure 9:
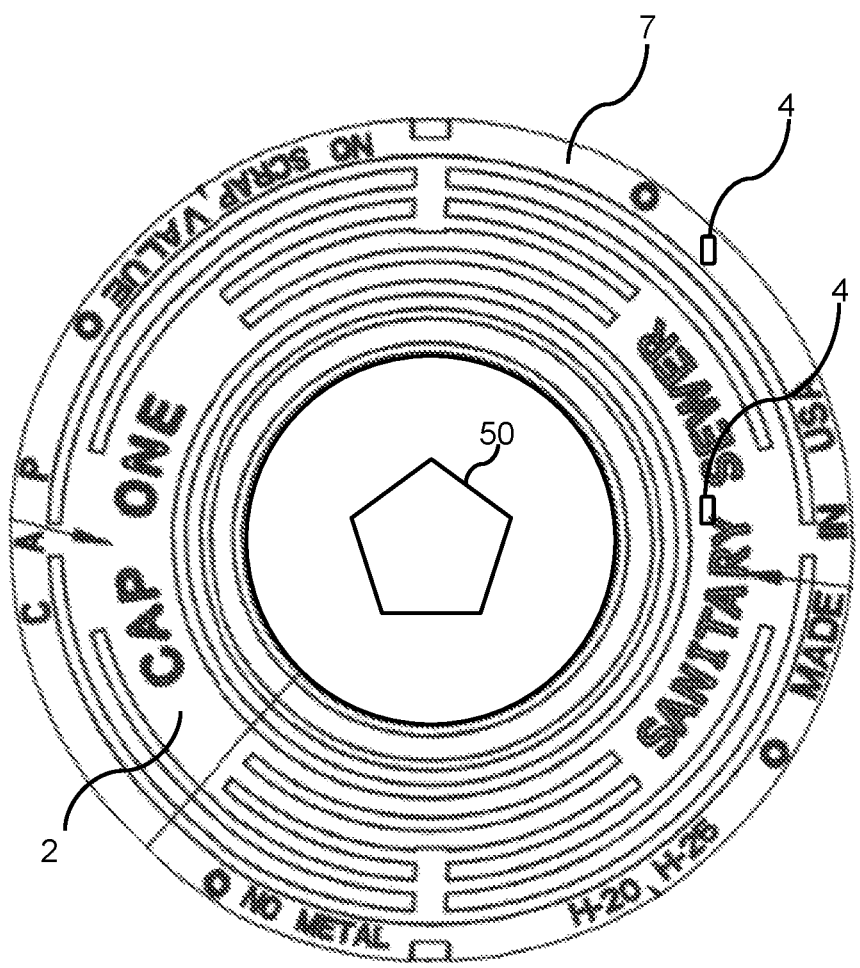
FIG. 9 illustrates a second plan view of the composite manhole frame and manhole cover with embedded magnetic material.

Referring to FIGS. 8 and 9, views of the composite manhole frame 7 and composite manhole cover 2 are shown with embedded mass of magnetic material 50.

Often, manhole covers and manhole frames are covered or obscured by materials such as pavement (e.g. asphalt), dirt, sand, etc. Once the manhole covers and manhole frames are covered or obscured, they are difficult to locate as there are little or no visual clues as to their location. In the past, a simple metal detector was used to locate obscured metal manhole covers and/or metal manhole frames as the metal detector signals the presence of such metals (e.g. iron). As the disclosed composite manhole covers 2 and composite manhole frames 7 are made from a composite material (non-magnetic), such composite manhole covers 2 and composite manhole frames 7 are not locatable using metal detectors. To enable locating of the disclosed composite manhole covers 2 and composite manhole frames 7, a mass of magnetic material 50 is embedded into the composite manhole cover 2 and/or the composite manhole frame 7 during the molding process. In some embodiments, the mass of magnetic material 50 is iron. In some embodiments, the mass of magnetic material 50 is a permanent magnet. Although any location in the composite manhole cover 2 and/or the composite manhole frame 7 is anticipated, a central location close to the top surface of the composite manhole cover 2 is preferred, as well as a location near the top of the composite manhole frame 7.

It is fully anticipated that the composite manhole cover 2 and/or the composite manhole frame 7 include the mass of magnetic material 50 with or without electronic/mechanical components 4 that are molded into the composite manhole frame 7 and/or the composite manhole cover 2.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:
1. A composite manhole assembly comprising:
   a manhole cover comprising:
      a disc-shaped body made of a fiber-reinforced thermosetting composite, the disc-shaped body having a cavity therein defined by boundaries of an embedded mass of magnetic material;
      the disc-shaped body having an edge;
      the mass of magnetic material being detectable by a metal detector;
      the mass of magnetic material is locatable by the metal detector when the mass of magnetic material is obscured by a pavement;
      the manhole cover is adapted to support vehicle traffic by comprising fiber reinforced thermoset polymers to pass a 20 tons proof-load test, wherein the disc-shaped body comprises at least one electronic component that is placed within the fiber reinforced thermoset polymers prior to curing of the fiber reinforced thermoset polymers;
   a manhole frame being substantially ring-shaped and having an external circumference and an interior circumference, the interior circumference having a supporting edge adapted to physically couple with the edge of the disc-shaped body such that the disc-shaped body is securely nest therein; and
   the manhole frame comprises a fiber reinforced thermoset polymer.
2. The composite manhole assembly of claim 1, wherein the magnetic material consists of a permanent magnet.
3. The composite manhole assembly of claim 1, wherein the magnetic material consists of iron.

4. The composite manhole assembly of claim 1, wherein the fiber-reinforced thermosetting composite is selected from the group consisting of: unsaturated polyester, vinyl ester, and epoxy.

5. The composite manhole assembly of claim 1, wherein the fiber-reinforced thermosetting composite includes a carbon black pigment to provide ultraviolet resistance.

6. The composite manhole assembly of claim 1, wherein the fiber-reinforced thermosetting composite is a mixture of one or more materials selected from the group consisting of a polyester resin, a polyurethane, a phenol-formaldehyde resin, urea-formaldehyde, benzoxazines, an epoxy resin, diallyl-phthalate, polyimides, furan, a silicone, and a vinyl ester.

* * * * *